United States Patent
Nagghappan et al.

(10) Patent No.: US 10,843,946 B2
(45) Date of Patent: Nov. 24, 2020

(54) PROCESS FOR REMOVING SILICA FROM PRODUCED WATER AND OTHER WASTEWATER STREAMS

(71) Applicants: LNSP Nagghappan, Irvine, CA (US); John A. Korpiel, Wexford, PA (US); VEOLIA WATER SOLUTIONS & TECHNOLOGIES SUPPORT, Saint-Maurice (FR)

(72) Inventors: LNSP Nagghappan, Irvine, CA (US); John A. Korpiel, Wexford, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/318,723

(22) PCT Filed: Jul. 28, 2017

(86) PCT No.: PCT/US2017/044293
§ 371 (c)(1),
(2) Date: Jan. 18, 2019

(87) PCT Pub. No.: WO2018/026641
PCT Pub. Date: Feb. 8, 2018

(65) Prior Publication Data
US 2019/0256388 A1 Aug. 22, 2019

Related U.S. Application Data

(60) Provisional application No. 62/369,372, filed on Aug. 1, 2016.

(51) Int. Cl.
*C02F 1/28* (2006.01)
*C02F 1/52* (2006.01)
(Continued)

(52) U.S. Cl.
CPC ............... *C02F 1/66* (2013.01); *C02F 1/281* (2013.01); *C02F 5/06* (2013.01); *C02F 1/5254* (2013.01);
(Continued)

(58) Field of Classification Search
None
See application file for complete search history.

(56) References Cited

U.S. PATENT DOCUMENTS

| 2,428,418 A | 10/1947 | Goetz, et al. |
| 3,262,877 A | 7/1966 | Le Compte, Jr. |

(Continued)

FOREIGN PATENT DOCUMENTS

| CA | 2671928 A1 | 6/2008 |
| CL | 2019001422 A1 | 8/2019 |

(Continued)

*Primary Examiner* — Bradley R Spies
(74) *Attorney, Agent, or Firm* — Coats & Bennett PLLC

(57) ABSTRACT

An oil or gas recovery process (10) is disclosed where resulting produced water includes silica. The process entails removing silica from the produced water via a two-stage process. In the first stage, magnesium oxide is injected into a Magnesium Dissolution Reactor (18) and mixed with the produced water to dissolve magnesium. Effluent from the Magnesium Dissolution Reactor (18) is directed downstream to a warm lime softener (22) where one or more alkaline chemicals are added to the produced water to raise the pH to approximately 10.0 to 11.5. Here, silica is co-precipitated with magnesium hydroxide and/or adsorbed onto magnesium hydroxide precipitates.

3 Claims, 2 Drawing Sheets

(51) Int. Cl.
*C02F 1/66* (2006.01)
*C02F 101/10* (2006.01)
*C02F 103/10* (2006.01)
*C02F 103/36* (2006.01)
*C02F 5/06* (2006.01)
*C02F 5/02* (2006.01)

(52) U.S. Cl.
CPC .......... *C02F 5/025* (2013.01); *C02F 2101/10* (2013.01); *C02F 2103/10* (2013.01); *C02F 2103/365* (2013.01); *C02F 2209/06* (2013.01); *C02F 2305/00* (2013.01); *C02F 2305/14* (2013.01)

(56) References Cited

U.S. PATENT DOCUMENTS

| | | |
|---|---|---|
| 7,815,804 B2 | 10/2010 | Nagghappan |
| 9,067,801 B2 | 6/2015 | Nagghappan |
| 2008/0135478 A1* | 6/2008 | Zuback ................ B01D 61/022 210/638 |

FOREIGN PATENT DOCUMENTS

| | | |
|---|---|---|
| GB | 1090822 | 11/1967 |
| WO | 2018098519 A1 | 6/2018 |

* cited by examiner

PROCESS FOR REMOVING SILICA FROM PRODUCED WATER AND OTHER WASTEWATER STREAMS

RELATED APPLICATIONS

The present application is a U.S. National Stage Application of PCT Application No. PCT/US2017/044293, with an international filing date of Jul. 28, 2017. Applicant claims priority based on U.S. Patent Application No. 62/369,372 filed Aug. 1, 2016. The subject matter of these applications is incorporated herein in their entirety.

FIELD OF THE INVENTION

The present invention relates to oil and gas recovery processes and more particularly to processes for treating produced water and other wastewater streams containing silica.

BACKGROUND OF THE INVENTION

Oil and gas recovery processes, as well as other industrial processes, produce wastewater streams that contain appreciable amounts of silica, both naturally occurring and man-made. Because silica has a tendency to form deposits for "scale" on surfaces it contacts, its presence is undesirable in wastewater treatment processes.

SUMMARY OF THE INVENTION

The present invention, in one embodiment, discloses a process for treating a wastewater stream containing silica. A two-stage or two-step process is employed. In the first stage, the wastewater stream is directed into a Magnesium Dissolution Reactor. Magnesium oxide is injected into the Magnesium Dissolution Reactor and mixed with the wastewater stream therein. The pH of the wastewater in the Magnesium Dissolution Reactor is controlled and maintained at 8.5 or less. Magnesium is dissolved in the Magnesium Dissolution Reactor. In stage two, the wastewater stream is directed, directly or indirectly, from the Magnesium Dissolution Reactor to a warm lime softener. One or more alkaline reagents are added such that the pH is adjusted upwardly from the pH found in Magnesium Dissolution Reactor. More particularly, the pH is preferably raised to approximately 10.0 to approximately 11.5. In the warm lime softener, silica is removed by adsorption onto magnesium hydroxide precipitates or silica is removed through a co-precipitation process with the magnesium hydroxide. Thereafter, the wastewater stream, including the precipitated magnesium hydroxide along with adsorbed or co-precipitated silica is directed to a solids-liquid separation device which separates and removes the magnesium hydroxide, along with adsorbed or co-precipitated silica from the wastewater stream.

The present invention also, in another embodiment, relates to a method of recovering oil from an oil bearing formation and treating the resulting produced water which contains dissolved silica. This method includes recovering an oil-water mixture from the oil bearing formation and separating the oil-water mixture to produce an oil product and the produced water having the dissolved silica therein. The method further includes directing the produced water to a Magnesium Dissolution Reactor. The pH of the produced water in the Magnesium Dissolution Reactor is maintained at 8.5 or less. This results in the magnesium dissolving in the Magnesium Dissolution Reactor. Hence, by pre-dissolving the magnesium, this makes the dissolved magnesium available to a downstream reactor to efficiently remove silica. Further, the process entails directing the produced water and dissolved magnesium from the Magnesium Dissolution Reactor, directly or indirectly, to a warm lime softener located downstream of the Magnesium Dissolution Reactor. One or more alkaline reagents is mixed with the produced water to raise the pH of the produced water in the warm lime softener to approximately 10.0 to approximately 11.5. In the warm lime softener, silica co-precipitates with magnesium hydroxide or silica is adsorbed onto precipitated magnesium hydroxide. Thereafter, the produced water is directed to a solids-liquid separator which separates the magnesium hydroxide and precipitates or adsorbed silica from the produced water.

EXEMPLARY EMBODIMENTS

Figure 1:
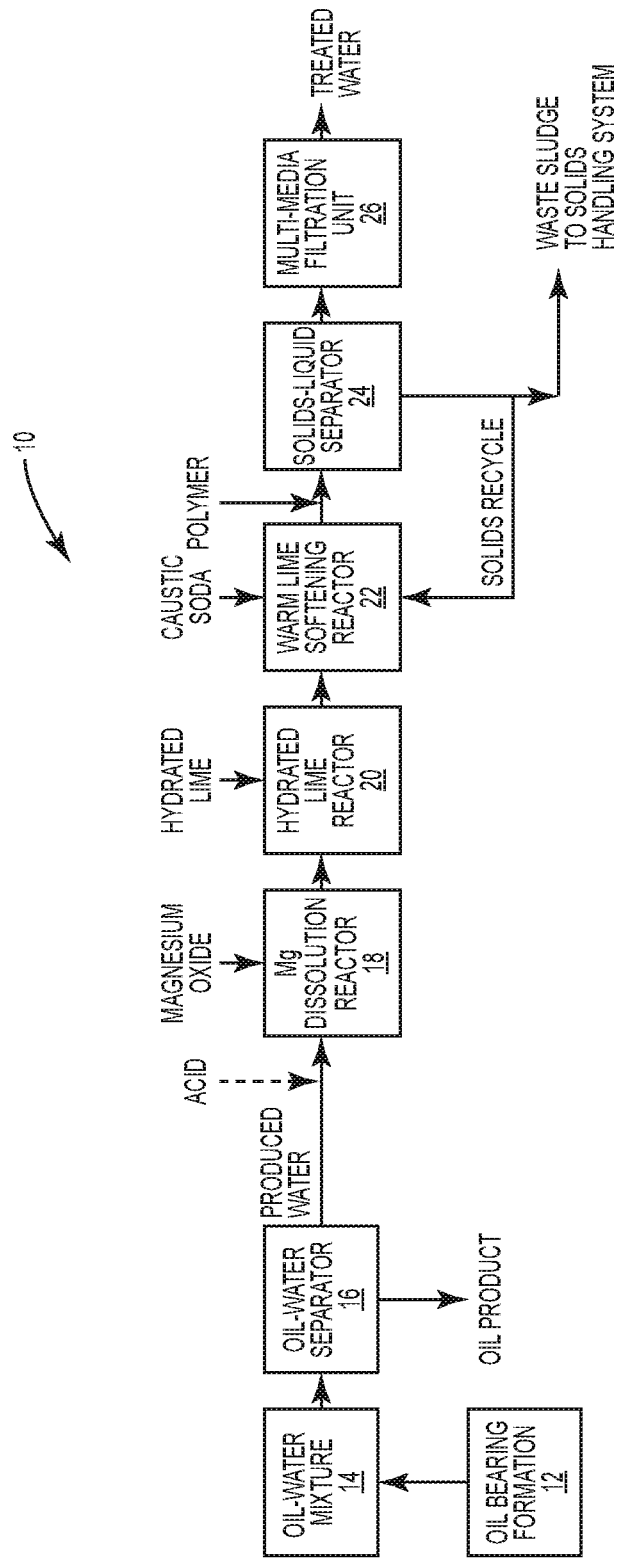
FIG. 1 is a schematic illustration of an oil recovery process and the treatment of resulting produced water containing silica.

With further reference to the drawings, particularly FIG. 1, there is shown therein an oil or gas recovery process indicated generally by the numeral 10. Viewing FIG. 1, an oil-water mixture 14 is collected from an oil-bearing formation 12. The oil-water mixture 14 is directed to an oil-water separator 16 which separates the oil-water mixture into an oil product and produced water. This is commonly referred to as primary separation and can be carried out by various conventional processes, such as gravity or centrifugal separation. The produced water, in some cases, is subjected to a polishing de-oiling process where additional oil is removed from the produced water. Produced water typically contains suspended solids, silica, organics, emulsified oil, free oil and dissolved solids.

The resulting produced water in the process shown in FIG. 1 is directed to an optimal Magnesium Dissolution Reactor 18. Magnesium Dissolution Reactor 18 includes a mixer that functions to mix magnesium oxide (a solid) with the produced water in the Magnesium Dissolution Reactor. Effluent from the Magnesium Dissolution Reactor 18 is directed to a hydrated lime reactor 20. This is optional. Hydrated lime is added and mixed with the produced water in the hydrated lime reactor 20.

Effluent from the hydrated lime reactor 20 is directed to a warm lime softening reactor indicated by the numeral 22. Here, chemical softening of the produced water takes place. In some embodiments, the warm lime softening reactor 22 may include a series of reactors, such as disclosed in U.S. Pat. No. 7,815,804, the disclosure of which is expressly incorporated herein by reference. In any event, the warm lime softening reactor 22 functions to remove hardness, particularly calcium and magnesium, from the produced water. Effluent from the warm lime softening reactor is directed to a solids-liquid separator 24. Solids-liquid separator 24 functions to remove suspended solids and precipitates from the produced water. As seen in FIG. 1, a portion of the solids removed by the solids-liquid separator 24 is recycled to the warm lime softening reactor 24. Various types of solids-liquid separators can be employed. For example, clarifiers can be used, as well as membrane separation units, such as ceramic membranes and other suitable membrane separation devices that are effective in removing suspended solids and precipitates from the produced water.

Downstream of the solids-liquid separator 24 is a multi-media filtration unit 26. Although a multi-media filtration unit is disclosed, other types of filtration can be used here to remove solids and precipitates that are not captured and removed by the solids-liquid separator 24. In any event, the effluent from the multi-media filtration unit 26 constitutes treated water and can be discharged or used in various ways. For example, the treated water can be used as feedwater for steam generation equipment, especially when the process of the present invention is employed in a heavy oil recovery process, such as a steam assist gravity discharge (SAGD) process. In other cases, the treated water can be further treated such as in an ion exchange unit that is designed to remove residual hardness. In this example, the effluent from the ion exchange unit can be directed to one or more reverse osmosis (RO) units to remove an array of dissolved solids from the feed to the RO units.

The strategic employment of the Magnesium Dissolution Reactor 18 and the warm lime softening reactor 22 aims to improve the removal of silica from the produced water. This is referred to as a two-stage or two-step process because of the particular functions carried out by the Magnesium Dissolution Reactor 18 and the warm lime softener 22. While silica removal is enhanced by the present process, it is noted that this integrated produced water treatment process also removes hardness, suspended solids and free oil.

Continuing to refer to the process shown in FIG. 1, magnesium oxide, a sparingly soluble magnesium compound, is injected into the Magnesium Dissolution Reactor 18 and mixed with the produced water. The pH in the Magnesium Dissolution Reactor 18 is controlled. Generally the pH of the produced water in the Magnesium Dissolution Reactor 18 is maintained at a pH of 8.5 or below. This converts the magnesium oxide (a solid) to dissolved magnesium salts. The dissolution of Magnesium oxide in the Magnesium Dissolution Reactor 18 forms dissolved magnesium as described by the following chemical reactions:

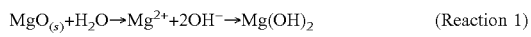  (Reaction 1)

  (Reaction 2)

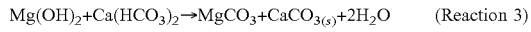  (Reaction 3)

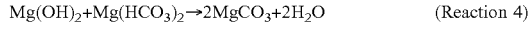  (Reaction 4)

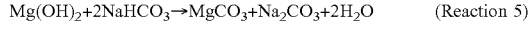  (Reaction 5)

First, the magnesium oxide dissolves into the water as magnesium ions as per Reaction 1, momentarily resulting in the formation of soluble magnesium hydroxide. However, due to raw produced water typically being at a pH that is near neutral (i.e., pH 7+/−0.5), the magnesium hydroxide immediately reacts with the carbon dioxide in the produced water as per Reaction 2 to form magnesium bicarbonate. The remaining magnesium hydroxide generated from Reaction 1 reacts with calcium bicarbonate as per Reaction 3, with magnesium bicarbonate as per Reaction 4, and with sodium bicarbonate as per Reaction 5 to form magnesium carbonate.

The injection of magnesium oxide via Reaction 1 and the resulting Reactions 2 through 5 causes the pH of the produced water to increase due to the hydroxide alkalinity associated with magnesium oxide hydration. At a pH of 8.5 or less, the speciation of the dissolved magnesium added into the Magnesium Dissolution Reactor 18 is approximately 90-95% magnesium bicarbonate (product of Reaction 2) and 5-10% magnesium carbonate (combined product of Reactions 3, 4, and 5). Thus Reactions 1 and 2 are the main reactions and are converted fully to completion whereas Reactions 3, 4, and 5 convert only partially. The partial conversion of Reaction 3 occurs at a pH of 8.3 or greater because the solubility of calcium carbonate is exceeded resulting in unwanted calcium carbonate precipitation in the Magnesium Dissolution Reactor 18. It is desirable to maximize Reactions 1 and 2 and to minimize Reactions 3 through 5.

The higher the produced water temperature and the lower the pH in the Magnesium Dissolution Reactor 18, the more effective is the magnesium oxide dissolution. In applications in which the produced water temperature is less than 120 deg F. and the raw produced water pH (before chemical addition) is greater than 6.5, acid is pre-injected into the produced water pipeline feeding the Magnesium Dissolution Reactor 18 to enhance the magnesium oxide dissolution efficiency. See FIG. 1. Acid may also be injected to maintain the pH of the Magnesium Dissolution Reactor at 8.3 or less in order to minimize the unwanted precipitation of calcium carbonate in Reaction 3. Typically sulfuric acid is used as the acid source, but in some cases hydrochloric acid may be used instead. The injected sulfuric acid lowers the pH of the produced water, converting bicarbonate alkalinity to carbon dioxide as follows:

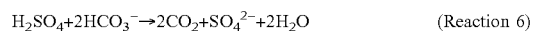  (Reaction 6)

The additional carbon dioxide generated by Reaction 6 will react with the magnesium hydroxide formed in Reaction 1 and convert it to magnesium bicarbonate as per Reaction 2. The addition of acid maximizes the conversion of Reactions 1 and 2 and reduces the conversion of Reactions 3, 4, and 5.

Stage one of the process entails injecting magnesium oxide into the Magnesium Dissolution Reactor 18 and mixing the magnesium oxide with the produced water. Magnesium oxide is more efficiently converted to dissolved magnesium when it is injected into a Magnesium Dissolution Reactor 18 that is maintained at a pH less than or equal to 8.5. As a result the magnesium salts that are pre-dissolved in the Magnesium Dissolution Reactor 18 are readily available to react in the downstream warm lime softener reactor (stage 2) for improved silica removal efficiency.

The produced water that has been pre-dissolved with magnesium salts from stage 1 flows into the warm lime softener Reactor 22 where alkali chemicals such as hydrated lime and/or caustic soda are injected (either directly or via the solids recycle line) to raise the pH to the range of 10.0-11.5 in order to facilitate the following standard warm lime softener precipitation reactions:

The calcium salts present in the produced water are precipitated as calcium carbonate solids.

Dissolved magnesium salts formed from the addition of Magnesium oxide into the Magnesium Dissolution Reactor 18 (i.e., Reactions 2 through 5) along with magnesium salts already present in the raw produced water are precipitated as magnesium hydroxide solids.

Silica in the produced water becomes ionized in the form of dissolved silicate and is removed via adsorption onto the surface of the magnesium hydroxide solids and/or via co-precipitation with magnesium hydroxide. Also, a portion of the dissolved silicate is likely removed via precipitation as magnesium silicate salts.

The process of FIG. 1 produces an effluent that is referred to as treated water. The treated water from the process discussed above will generally meet the effluent quality goals for hardness, silica, suspended solids and free oil concentrations. Hence, the treated water can be employed in any one of the following:

> For reuse as injection water for oil/gas extraction
> For reuse as make-up water for steam generation (after additional treatment by ion exchange softening)
> For any other reuse applications at an oilfield or gas field (directly or after further treatment)
> Undergo further treatment (e.g., desalination by membrane or thermal technologies) such that the water can be permitted by the appropriate regulatory agencies for any of the following: reuse for irrigation purposes, discharge to a surface water or wetlands, discharge to a groundwater aquifer, or any other beneficial reuse.
> Disposed of via injection into a deep well or formation well
> Any combination of the above.

Figure 2:
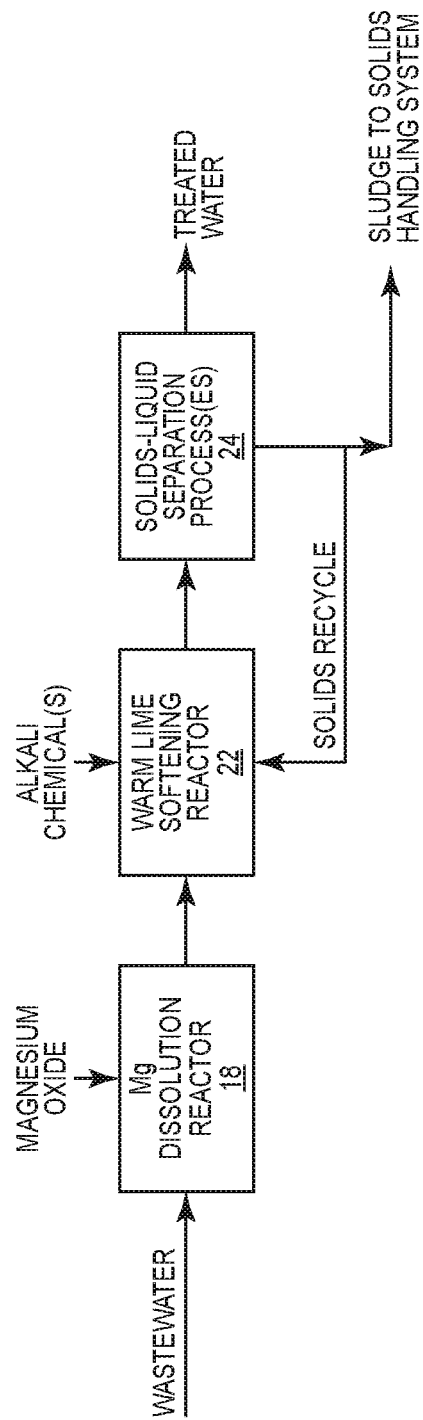
FIG. 2 is a schematic illustration of a wastewater treatment process that includes a two-stage or two-step process for removing silica from the wastewater stream.

FIG. 2 shows another embodiment of the present invention. The embodiment shown in FIG. 2 discloses a system and process for treating a wastewater stream containing silica. In this case, the system and process includes a number of components. In particular, the process of FIG. 2 includes the Magnesium Dissolution Reactor 18. Again in this case, magnesium oxide is injected into the Magnesium Dissolution Reactor 18 and mixed with the wastewater. The injection of the magnesium oxide into the Magnesium Dissolution Reactor 18 results in the magnesium being converted to soluble magnesium at a point upstream from the warm lime softening reactor 22. The wastewater in the Magnesium Dissolution Reactor is maintained at a pH of 8.5 or less. The lower the pH is, the more effective the dissolution of magnesium oxide. The injection of magnesium oxide results in the magnesium oxide reacting with water to form magnesium hydroxide. Being that the pH is 8.5 or less, the magnesium hydroxide quickly reacts with carbon dioxide present in the wastewater to form magnesium bicarbonate. Some of the magnesium hydroxide further reacts with newly formed magnesium bicarbonate to form magnesium carbonate. The magnesium hydroxide also reacts with bicarbonate alkalinity already present in the wastewater, such as calcium bicarbonate and sodium bicarbonate, for example, to form magnesium carbonate. Thus the speciation of dissolved magnesium in the wastewater in the Magnesium Dissolution Reactor 18 is a mix of soluble magnesium bicarbonate and magnesium carbonate.

The required dosage of magnesium oxide, in both the processes of FIG. 1 and FIG. 2, is application specific. Generally the dosage requirement for the magnesium oxide is a function of the temperature of the wastewater, the pH of the wastewater, and the magnesium and silica concentration of the wastewater, as well as the silica removal target.

There are a number of advantages to this two-stage process of removing silica from a wastewater stream or produced water. By employing this approach to silica removal, there is an increased conversion efficiency in converting the magnesium oxide into soluble magnesium salts. In addition, this two-stage process results in lower magnesium oxide dosage to achieve a silica removal goal, improves silica removal efficiency, and improves membrane filtration performance downstream of the warm lime softener reactor 22. Specifically, this process mitigates the high membrane fouling rate generally associated with wastewater streams that include appreciable silica concentrations.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of recovering oil from an oil-bearing formation and treating the resulting produced water which includes dissolved silica, the method comprising:
    recovering an oil-water mixture from the oil-bearing formation;
    separating oil from the oi-water mixture to produce an oil product and the produced water having the dissolved silica therein;
    directing the produced water to a Magnesium Dissolution Reactor containing a mixer;
    dosing the produced water with magnesium oxide by injecting magnesium oxide in a solid form into the Magnesium Dissolution Reactor;
    using the mixer in the Dissolution Reactor, mixing the magnesium oxide with the produced water in the Magnesium Dissolution Reactor;
    maintaining the pH of the produced water in the Magnesium Dissolution Reactor at 8.5 or less;
    dissolving magnesium in the Magnesium Dissolution Reactor wherein the dissolution reactor pre-dissolves the magnesium such that the dissolved magnesium is available to react downstream to efficiently remove silica;
    after mixing the magnesium oxide with the produced water in the Magnesium Dissolution Reactor, directing the produced water and dissolved magnesium from the Magnesium Dissolution Reactor, directly or indirectly, to a warm lime softener located downstream of the Magnesium Dissolution Reactor;
    mixing one or more alkaline reagents with the produced water and raising the pH of the produced water in the warm lime softener to approximately 10.0 to approximately 11.5;
    in the warm lime softener, co-precipitating silica with magnesium hydroxide or adsorbing silica onto precipitated magnesium hydroxide; and
    directing the produced water and precipitates therein from the warm lime softener to a solids-liquid separator and separating the magnesium hydroxide and precipitated or adsorbed silica from the produced water.

2. The method of claim 1 including adjusting the pH of the produced water downwardly by mixing an acid with the produced water upstream of the Magnesium Dissolution Reactor or by mixing the acid with the produced water in the Magnesium Dissolution Reactor.

3. The method of claim 1 wherein there is provided a hydrated lime reactor disposed between the Magnesium Dissolution Reactor and the warm lime softener, and wherein the method includes injecting hydrated lime into the hydrated lime reactor and mixing the hydrated lime with the produced water after the magnesium oxide has been mixed with the produced water and before the produced water enters the warm lime softener.

* * * * *